US006911266B1

(12) United States Patent
Skov

(10) Patent No.: US 6,911,266 B1
(45) Date of Patent: Jun. 28, 2005

(54) BLOW-MOLDED ARTICLES WITH DECORATIVE FINISH

(75) Inventor: Erik Lee Skov, Akron, OH (US)

(73) Assignee: Rubbermaid Incorporated, Wooster, OH (US)

( * ) Notice: Subject to any disclaimer, the term of this patent is extended or adjusted under 35 U.S.C. 154(b) by 93 days.

(21) Appl. No.: 10/403,939

(22) Filed: Mar. 31, 2003

(51) Int. Cl.[7] .............................................. B32B 9/00
(52) U.S. Cl. ................. 428/542.8; 264/255; 264/297.2; 264/328.4; 264/328.8; 264/328.14; 264/328.15; 264/328.16; 264/328.19; 264/401; 264/513
(58) Field of Search ...................... 428/542.8; 264/255, 264/297.7, 328.4, 328.8, 328.14, 328.15, 328.16, 328.19, 401, 513

(56) References Cited

U.S. PATENT DOCUMENTS 4,149,839 A * 4/1979 Iwawaki et al. ......... 425/133.1

5,595,799 A * 1/1997 Beck et al. ................. 428/35.7

FOREIGN PATENT DOCUMENTS

| JP | 05008354 A | * | 1/1993 | ........... B32B/27/32 |
| JP | 2000139646 A | * | 5/2000 | ............. A47F/8/00 |

* cited by examiner

Primary Examiner—Sandra M. Nolan
(74) Attorney, Agent, or Firm—Marshall, Gerstein & Borun LLP

(57) ABSTRACT

A blow-molded decorative article is disclosed which comprises a plurality of different polymers having different melt flow rates that cause inter-dispersion of the polymers upon blow-molding. The article is blow-molded from a multiple layer parison that a plurality of layers of like polymers, i.e., polyethylenes, polypropylenes, polystyrenes, etc., that have different melt flow rates and different colors. As a result in the differences in the melt flow rates, the polymers of the various layers mix upon blow-molding to create the look of a glazed ceramic pottery or an exterior pattern such as a tie-dyed marbleized or camouflaged pattern.

19 Claims, 1 Drawing Sheet

BLOW-MOLDED ARTICLES WITH DECORATIVE FINISH

TECHNICAL FIELD

Multiple component blow-molded plastic articles are disclosed which provide a simulated decorative finish in a variety of patterns. Methods of manufacturing such a blow-molded articles are also disclosed.

DESCRIPTION OF THE RELATED ART

Hand-made or manufacturing ceramic or pottery items are known in the art. Often, glazing or hand painting is carried out which renders a multicolored and often textured appearance. Numerous artistic designs can be achieved and each glazed item typically has a unique finish.

However, ceramic items are relatively expensive and are breakable. To date, mass-produced plastic items have not been effectively designed to simulate the look or aesthetic appearance of ceramic pottery. Thus, simulated pottery in the form of plastic materials would be highly desirable given the fact that mass-produced plastic items are inexpensive and will not normally shatter, break or chip if dropped or mishandled.

However, to apply a decorative finish to a molded plastic article requires an additional process step in the form of screen printing or a similar printing process which increases the cost of the molded article. While multi-colored molded articles are available, the separate color segments are discreet from one another and, typically, molded articles have a single-color exterior surface or, include a generally solid exterior surface with discreet panels or segments of a different color. Currently, there is no known process for molding a plastic article with a multi-colored exterior surface that simulates that of natural marble (i.e., a marbleized design), a camouflage-type design or a tie-dye type design.

Accordingly, there is a need for molded plastic designs and methods of manufacture thereof whereby inexpensive items made of plastic can be provided with exterior surfaces having a simulated marbleized look, a camouflage design, a tie-dye design or the look or appearance of glazed ceramic pottery.

SUMMARY OF THE DISCLOSURE

Plastic articles are disclosed whereby the structure of article is blow-molded from a parison comprising two polymers with different rheological properties and different colors so that when the parison is blow-molded into the structure of the household article, the two polymers intermix to create a multi-colored finish.

For example, a decorative item is disclosed whereby the structure of the item is blow molded from a parison that comprises two different polyethylenes having two different melt flow rates and two different colors. The differences in the melt flow rates cause the two polyethylenes to intermix and create a decorative finish that can resemble that of natural marble (i.e., a marbleized finish), a camouflage pattern or a tie-dye pattern.

In addition to two different polyethylenes, two different polypropylenes, polystyrenes or other polymers can be utilized. Further, the parison can be fabricated from three or more polymers as well, so long as the three or more like polymers have different rheological properties, such as different melt flow rates, and different colors, resulting in an intermixing of the polymers together upon blow-molding.

One disclosed method for manufacturing the household articles in accordance with this disclosure is to provide a parison comprising two or more polymers, with different rheological properties and different colors, blow-molding a structure from the parison which results, due to the different rheological properties and different colors of the polymers, in a structure having a multiple color finish with a marbleized appearance, a camouflage pattern, a tie-dye pattern or that of a simulated glazed pottery item.

BRIEF DESCRIPTION OF THE DRAWINGS

The invention is described more or less diagrammatically in the accompanying drawings wherein.

DETAILED DESCRIPTION OF THE PRESENTLY PREFERRED EMBODIMENTS

Figure 1:
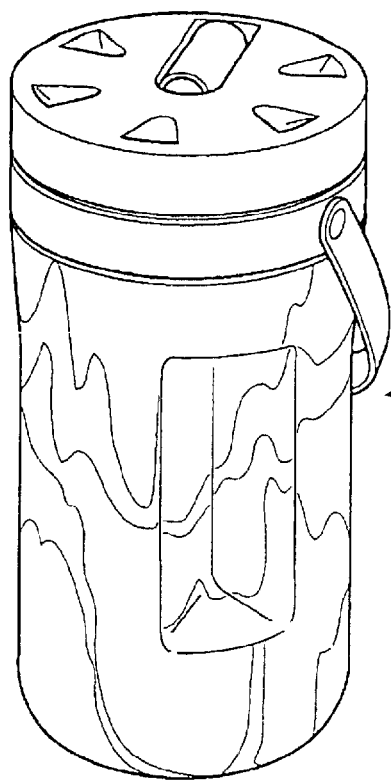
FIG. 1 is a perspective view of a blow-molded thermal beverage container made in accordance with this disclosure.

It has been found that the fabrication of parisons having multiple layers or segments made from like polymers but which have at least one different rheological property such as different polyethylenes, polypropylenes, polystyrenes, etc., or any two like polymers that can be blow-molded, and having different colors, can enable the high-speed manufacture of multi-color items with an appearance that simulates or resembles hand made pottery or glazed ceramic items or includes patterns such as camouflage, marbleized or tie-dye patterns.

By way of an example, one rheological property that varies greatly from polymer to polymer within the same class of polymers is the melt flow index or melt flow rate. The melt flow rate is defined as the amount, in grams, of a thermal plastic resin which can forced through an extrusion rheometer orifice of 0.0825 inch diameter when subjected to a force of 2,160 grams for a time period of 10 minutes at 190° C. Similarly, for more viscous polymers or polymers with higher melting rates, a more convenient rheological property is the high-load melt index or high-load melt flow rate which is defined as the rate of flow of a molten resin through an orifice of 0.0825 inch diameter rheometer when subjected to a force of 21,600 grams for 10 minutes at 190° C.

Indeed, a crucial factor affecting the possibility of polymers is the flow behavior of the melt. The melt flow rates (MFR) is a measurement that is easily made and easily understood. However, the value of MFR data is affected, for example, by the apparent inability of the above-described measuring techniques to predict the performance of the various materials in processing. Thus, finding the right combination of polymers to create the visual affect desired will require some trial and error.

Further, it is currently believed that extensional flows are more important than shear flows in blow-molding processes. Thus, as extensional flow is further understood, differences in extensional flow behavior of materials could also be used in addition to differences in melt flow rates to create the desired intermixing of polymers during a blow-molding process to create the desired ornamental affect.

Still further, differences in viscosities between polymers could be utilized to create an ornamental multi-color household item that is blow molded from a multiple component parison.

Finally, the addition of additives, such as an inorganic additive like titanium dioxide, could be utilized in this regard. Specifically, additives, and most particularly inorganic additives, tend to increase viscosity of the polymer melt. The use of an inorganic additive could be utilized to create rheological differences between two like polymers in one parison. For example, a parison could be fabricated from layers of two like polymers, one having substantial amounts of inorganic additive, and one being free of inorganic additive. Further, different layers could be utilized to form a parison, with a level of inorganic additive being different between the various layers. Upon blow molding, the layers would inter-mix at different rates due to different viscosities and presumably different melt flow rates thereby creating a multi-color blow-molding ornamental household item. The use of titanium dioxide additives could be used to add color or pigment to the various layers.

Returning to the concept of utilizing different but similar polymers with different melt flow rates, one preferred parison is a three-layer parison with all three layers consisting of high density polyethylenes (HDPE) as illustrated in Table I.

TABLE I

| Parison Layer | Material | Color | Melt Index (g/10 min) |
|---|---|---|---|
| inner | HHM5502BN | Green/Black | 0.35 |
| middle | HXM5010 | Brown | 10* |
| outer | HAM5502BN | Evergreen | 0.35 |

*The value for HXM5010 material is a high load melt index (190/21.60) versus the melt index value given for both HHM5502BN materials. The parison illustrated in Table I can be used for forming an article 10 with a camouflage pattern as illustrated in FIG. 1.

TABLE II

| Parison Layer | Material | Color | Melt Index (g/10 min) |
|---|---|---|---|
| inner | HHM5502BN | Green/Black | 0.35 |
| 2 | HXM50100 | Brown | 10* (HLMI; 190/21.60) |
| 3 | HHM5502BN | Evergreen | 0.35 |
| 4 | HHM5502BN | Evergreen | 0.35 |
| 5 | HHM5502BN | Evergreen | 0.35 |
| outer | HHM5502BN | Evergreen | 0.35 |

The six-layer parison of Table II provides a camouflage appearance like that of Table I. The HHM5502BN and HXM50100 HDPE's are sold under the trademark MARLEX® by CP Chem (Chevron Phillips Chemical Company LP) of Houston, Tex.

Another example would be to create a parison with one or more layers of the HYA-201 blow-molding resin and the HYA-204 blow-molding resin. Both of these resins are sold by Exxon Mobile Chemical. HYA-201 has a melt index or melt flow rate of 0.39 g/10 min while HYA-204 has a high load melt index or high load melt flow rate of 6.5 g/10 min. These two varying rheological properties could be utilized to fabricate a single parison having two or more layers of the various polymers, with the different polymers being different colored or having different pigments, and then the blow-molding of the parison will produce a blow-molded article having a multi-color decorative pattern.

Other examples are found in the HIPLEX® family of polymers sold by Hip-Petrochemija. Specifically, the HHM5502 has a melt flow rate of 0.35 while HHM5202 has a melt flow rate of 0.20. The differences between these two melt flow rates will result in the desired intermixing after blow-molding. Further, HXM50100 has a high load melt flow rate of 10, HXM45060 has a high load melt flow rate of 6 and HXM52020 has a high load melt flow rate of 2. The differences between the melt flow rates of these polymers could also be utilized to create the desired affect. Any combination of the above polymers could be used.

Figure 2:
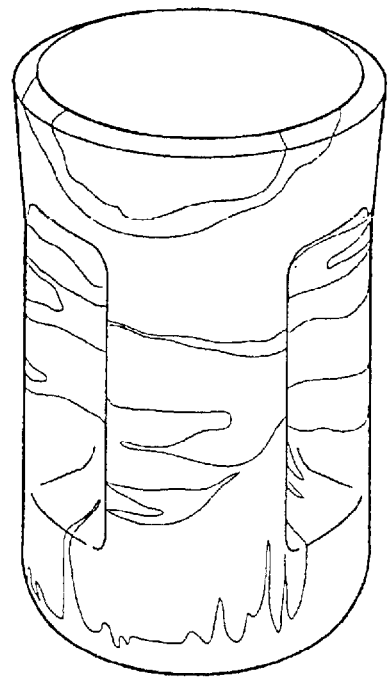
FIG. 2 is a perspective view of yet another blow-molded thermal beverage container made in accordance with this disclosure.
Figure 3:
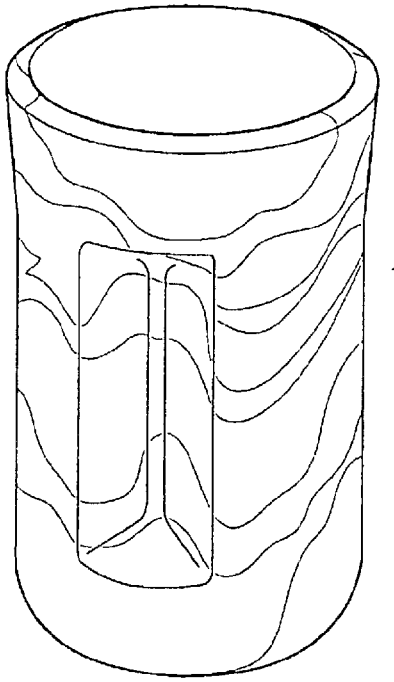
FIG. 3 is a perspective view of yet another blow-molded thermal beverage container made in accordance with this disclosure.

FIGS. 1–3 illustrate various types of exterior patterns that can be achieved using the above-concepts. Specifically, FIG. 1 illustrates a blow-molded insulated beverage container 10 with a camouflage-type exterior pattern that will be appreciated by outdoorsman. FIGS. 2 and 3 are also insulated beverage containers. FIG. 2 depicts a container 20 with a tie-dye exterior appearance while FIG. 3 illustrates a container 30 with a marbleized exterior surface.

Figure 4:
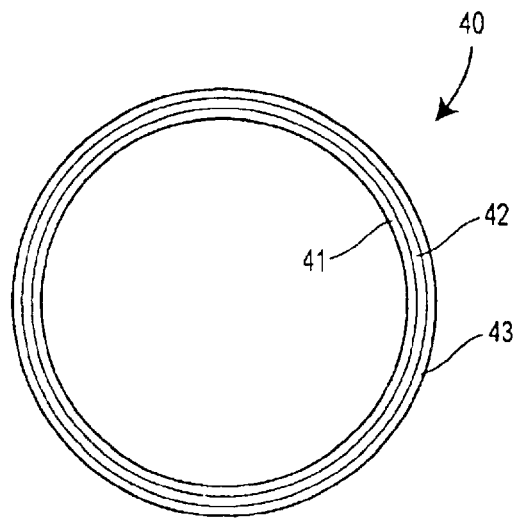
FIG. 4 is an end sectional view of a parison used to blow-mold articles like that shown in FIGS. 1–3.

As shown in FIG. 4, the parison 40 can contain two or more layers 41, 42, 43 with at least two different polymers having different colors. While a parison 40 is illustrated with three layers 41–43, parisons with two, four, five, six or more layers could be utilized. Parisons with circumferential segments of different polymers having different colors could also be constructed to create a blended vertical strip-type design. Various parison constructions are clearly anticipated.

The foregoing detailed description is given for clearness of understanding only, and no unnecessary limitation should be understood therefrom, as modifications within the spirit and scope of the invention will be apparent to those skilled in the art.

What is claimed is:

1. A decorative article comprising:
   a structure blow molded from a parison comprising a first polyethylene and a second polyethylene, the first polyethylene having a first melt flow rate and a first color, the second polyethylene having a second melt flow rate and a second color, the first melt flow rate being at least 50% greater than the second melt flow rate, the first color being different than the second color, the first and second polyethylenes being inter-dispersed in the blow molded article.

2. The decorative article of claim 1 wherein the parison comprises multiple layers with each layer consisting of the first polyethylene or the second polyethylene.

3. The decorative article of claim 1 wherein the first melt flow rate is a high load melt flow rate and the second flow rate is a high load melt flow rate.

4. The decorative article of claim 1 wherein at least one of the first and second polyethylenes is mixed with an inorganic additive.

5. The decorative article of claim 4 wherein the inorganic additive comprises titanium dioxide.

6. The decorative article of claim 1 wherein the parison further comprises a third polyethylene, the third polyethylene having a melt flow rate that is at least 50 percent less than the second melt flow rate.

7. A decorative article comprising:
   a structure blow molded from a multiple layer parison comprising at least one layer of a first polyethylene and at least one layer of a second polyethylene, the first polyethylene having a first melt flow rate and a first color, the second polyethylene having a second melt flow rate and a second color, the first melt flow rate being at least 50% greater than the second melt flow rate, the first color being different than the second color, the first and second polyethylenes being inter-dispersed in the blow molded article.

8. The decorative article of claim 7 wherein the parison further comprises a third polyethylene, the third polyethylene having a melt flow rate that is at least 50 percent less than the second melt flow rate.

9. A decorative article comprising:
a structure blow molded from a parison comprising a first polypropylene and a second polypropylene, the first polypropylene having a first melt flow rate and a first color, the second polypropylene having a second melt flow rate and a second color, the first melt flow rate being at least 50% greater than the second melt flow rate, the first color being different than the second color, the first and second polyethylenes being inter-dispersed in the blow molded article.

10. The decorative article of claim 9 wherein the parison comprises multiple layers with each layer consisting of the first polypropylene or the second polypropylene.

11. The decorative article of claim 9 wherein the first melt flow rate is a high load melt flow rate and the second flow rate is a high load melt flow rate.

12. The decorative article of claim 9 wherein at least one of the first and second polypropylenes is mixed with an inorganic additive.

13. The decorative article of claim 12 wherein the inorganic additive comprises titanium dioxide.

14. The decorative article of claim 9 wherein the parison further comprises a third polypropylene, the third polypropylene having a melt flow rate that is at least 50 percent less than the second melt flow rate.

15. A decorative article comprising:
a structure blow molded from a multiple layer parison comprising at least one layer of a first polypropylene and at least one layer of a second polypropylene, the first polypropylene having a first melt flow rate and a first color, the second polypropylene having a second melt flow rate and a second color, the first melt flow rate being at least 50% greater than the second melt flow rate, the first color being different than the second color, the first and second polypropylenes being inter-dispersed in the blow molded article.

16. The decorative article of claim 15 wherein the first melt flow rate is a high load melt flow rate and the second flow rate is a high load melt flow rate.

17. The decorative article of claim 15 wherein at least one of the first and second polypropylenes is mixed with an inorganic additive.

18. The decorative article of claim 17 wherein the inorganic additive comprises titanium dioxide.

19. The decorative article of claim 15 wherein the parison further comprises a third polypropylene, the third polypropylene having a melt flow rate that is at least 50 percent less than the second melt flow rate.

* * * * *